United States Patent [19]

Urbanek et al.

[11] 4,206,499

[45] Jun. 3, 1980

[54] VEHICLE MARKER LAMP

[75] Inventors: Karel Urbanek, Weston; Arthur F. Bleiweiss, Toronto, all of Canada

[73] Assignee: Dominion Auto Accessories Limited, Toronto, Canada

[21] Appl. No.: 823,660

[22] Filed: Aug. 11, 1977

[51] Int. Cl.[2] .......................... B60Q 1/00; B60Q 1/56

[52] U.S. Cl. ...................................... 362/80; 362/267; 220/327; 220/378; 215/DIG. 1

[58] Field of Search ................. 362/306, 31, 369, 368, 362/366, 365, 80, 267, 83; 277/207, DIG. 2, 209, 211; 220/81 R, 378, 327

[56] References Cited

U.S. PATENT DOCUMENTS

| | | | |
|---|---|---|---|
| 3,032,644 | 5/1962 | McGrew | 362/80 |
| 3,115,307 | 12/1963 | Dickson | 362/267 |
| 3,187,171 | 6/1965 | Trautner | 362/267 |
| 3,530,287 | 9/1970 | Husby | 362/267 |
| 4,108,466 | 8/1978 | Lloyd | 277/DIG. 2 |

*Primary Examiner*—Samuel W. Engle
*Assistant Examiner*—Edward F. Miles
*Attorney, Agent, or Firm*—Barnes, Kisselle, Raisch & Choate

[57] ABSTRACT

A vehicle lamp comprising a housing having a base wall and a peripheral wall surrounding the base wall and having a free edge and a first lens adapted to overlie the free edge of the peripheral wall. The peripheral wall has an opening therein extending toward the lens and a second lens is provided in the opening and has a free edge aligned with the free edge of the peripheral wall. An annular gasket is positioned on the peripheral wall and engages and holds the second lens in position. The first lens and the gasket have cooperating portions to provide a seal between the first lens and the gasket.

12 Claims, 9 Drawing Figures

VEHICLE MARKER LAMP

This invention relates to vehicle marker lamps and particularly to stop, tail and license plate vehicle lamps.

BACKGROUND AND SUMMARY OF THE INVENTION

In vehicle marker lamps for trucks and similar vehicles, it is common to combine the functions for a stop, tail and license plate lamp in a single vehicle lamp. In a typical lamp, such as shown in U.S. Pat. No. 3,115,307, the lamp comprises a housing having a peripheral wall, a lens closing the end of the peripheral wall, and a second lens in the peripheral wall which is adapted to illuminate the license plate. As shown in the aforementioned United States patent, the first lens functions to hold the license plate lens in position.

Among the problems with such a vehicle lamp is the provision of a satisfactory seal between the lenses and the housing and the meeting of optical standards in providing the desired rearward illumination upon energization of either the stop or tail lamp lens.

Accordingly, among the aspects of the invention are to provide a vehicle marker lamp which includes a novel seal construction and also provides for increased rearward illumination.

In accordance with the invention, the vehicle lamp comprises a housing having a base wall and a peripheral wall surrounding the base wall and having a free edge. A first lens is adapted to overlie the free edge of the peripheral wall. The peripheral wall has an opening therein extending toward the lens and a second lens is provided in the opening and has a free edge aligned with the free edge of the peripheral wall. An annular gasket is positioned on the peripheral wall and engages and holds the second lens in position. The first lens and the gasket have cooperating portions to provide a seal between the first lens and the gasket.

DESCRIPTION

Figure 1:
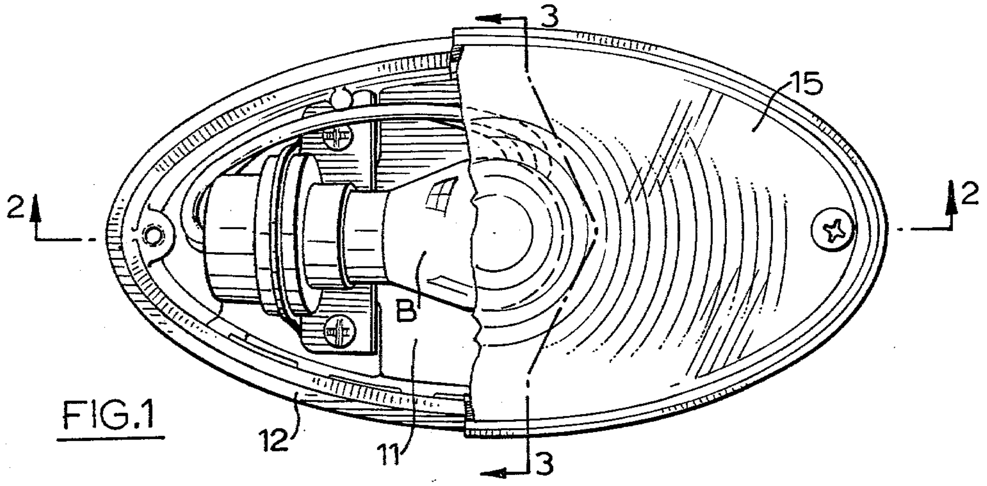
FIG. 1 is an elevational view of the vehicle marker lamp embodying the invention, parts being broken away.
Figure 2:
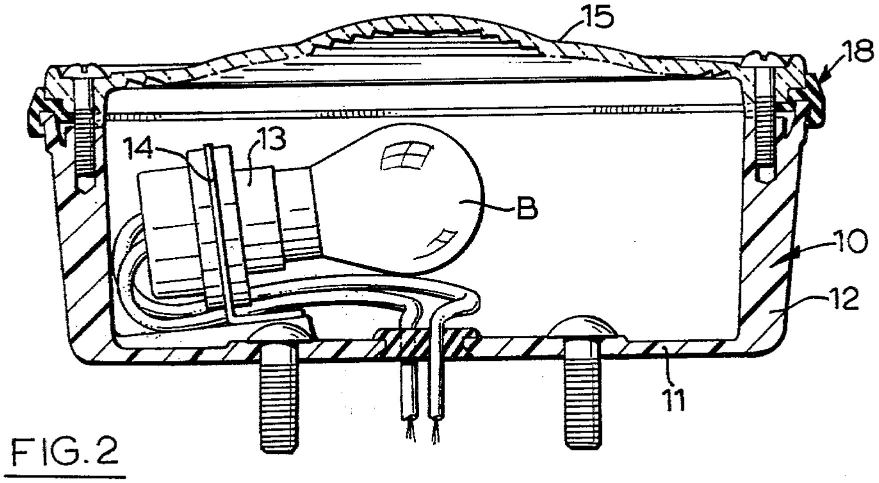
FIG. 2 is a sectional view taken along the line 2—2 in FIG. 1.
Figure 3:
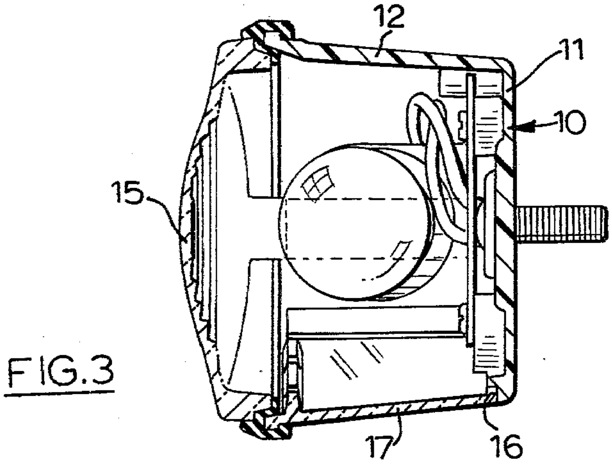
FIG. 3 is a sectional view taken along the line 3—3 in FIG. 1.
Figure 4:
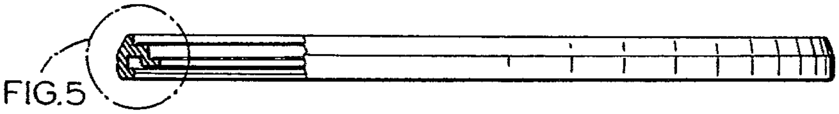
FIG. 4 is a part sectional side view of a gasket utilized in the lamp.

Referring to FIGS. 1—3, the stop, tail and license plate vehicle lamp embodying the invention comprises a housing 10, which is made of die cast metal, and includes a base wall 11 that is generally elongated oval in shape and a peripheral wall 12 extending upwardly from the base wall 11. A two filament bulb B is supported in any well known manner by a socket 13 and bracket 14 in the housing.

A first lens 15 having a generally elongated oval configuration is adapted to close the free upper end of the peripheral wall 12. The peripheral wall 12 is formed with an opening 16 into which a second lens 17 is inserted for purposes of illuminating the license plate (FIG. 3). The second lens 17 has a free edge aligned with the free edge of the peripheral wall 12.

In accordance with the invention, a gasket 18 is interposed between the first lens 15 and the peripheral wall 12. The gasket 18 engages the free edge of the peripheral wall 12 and the second lens 17, as presently described, to hold the lens 17 in position. In addition, the gasket 18 has surfaces engaging corresponding surfaces on the lens 15 to provide a seal between the lens 15 and the gasket, as presently described. As indicated in FIG. 8, the peripheral wall 12 is thickened to form a shoulder as at 19 which engages the end portions 20 of the lens 15.

Figure 5:
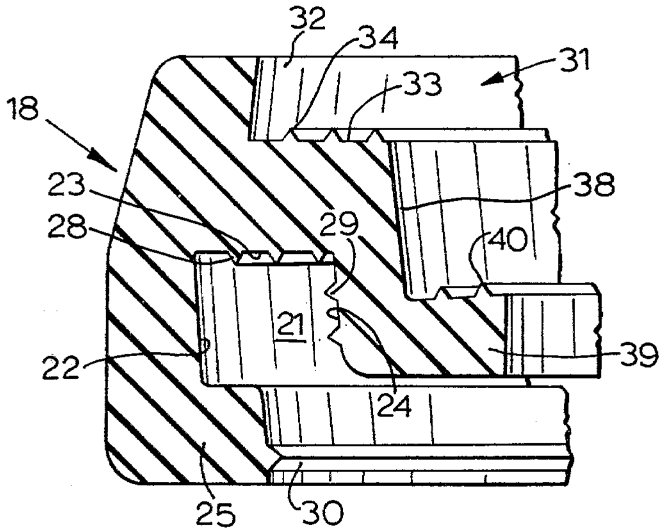
FIG. 5 is an enlarged sectional view of the encircled portion of the gasket in FIG. 4.
Figure 8:
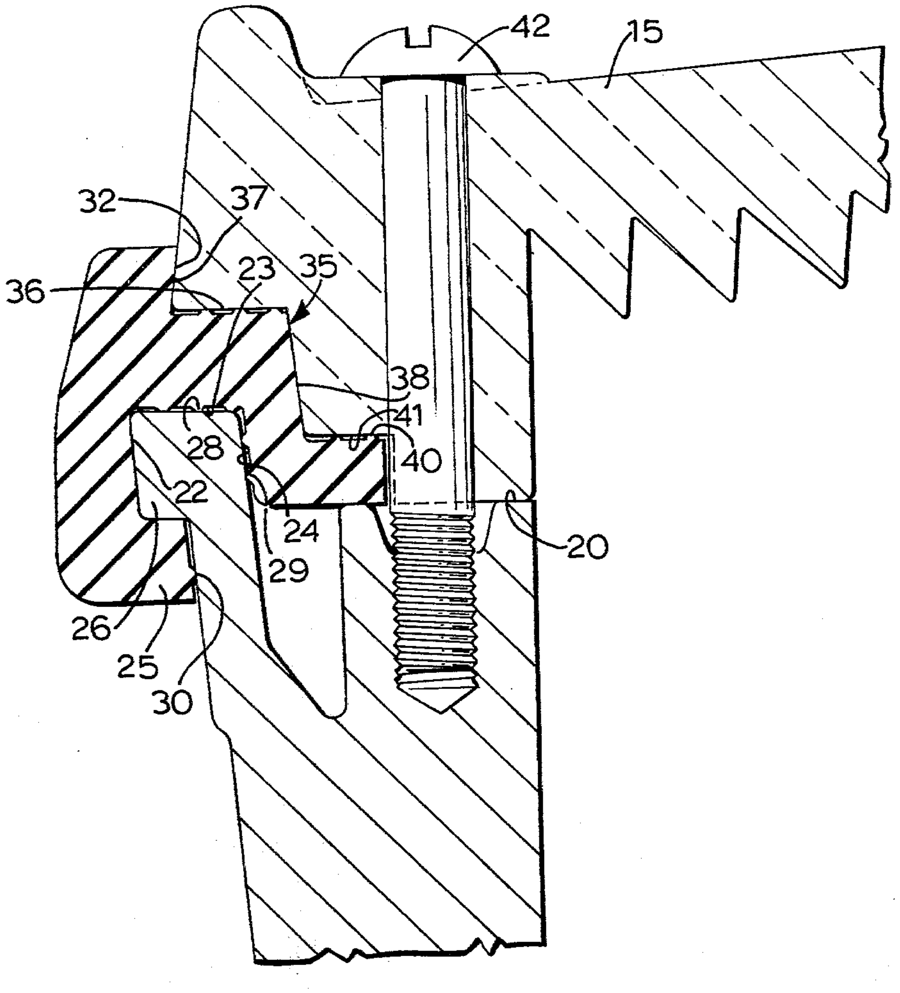
FIG. 8 is a fragmentary sectional view on an enlarged scale of the left hand portion of the lamp shown in FIG. 2.
Figure 9:
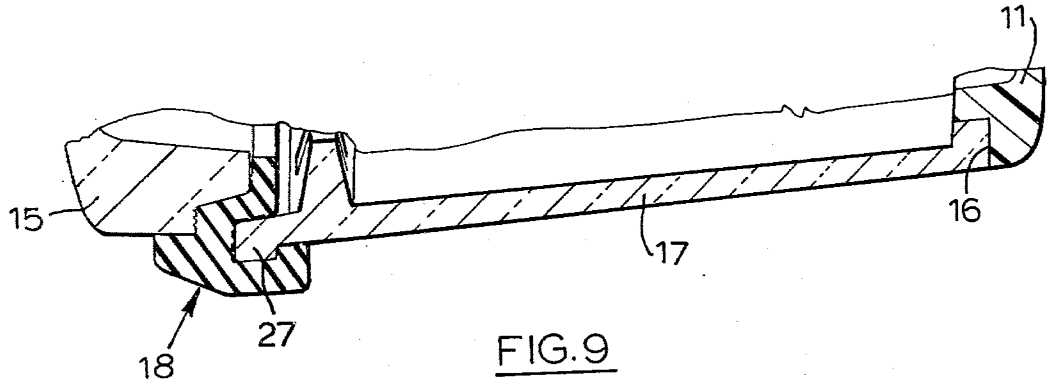
FIG. 9 is a fragmentary sectional view on an enlarged scale of a portion of the lamp shown in FIG. 3.

Referring to FIG. 5, the gasket 18 is annular in cross section and includes a groove 21 that telescopes over the free upper edge of the peripheral wall 12 and the lens 17 (FIG. 8). The groove 21 includes an outer side wall 22 that engages the outer surfaces of the peripheral wall 12 and lens 17, a base wall 23 that engages the top surface of the peripheral wall 12 and lens 17, and an inner wall 24 that engages the inner surface of the peripheral wall 12 and lens 17.

In addition, the gasket 18 includes a radially inwardly extending lip 25 that extends beneath a corresponding bead 26 on the wall 12 and 27 on the lens 17 (FIG. 8). Further, the base surface 23 and inner surface 24 are preferably formed with V-shaped labyrinthine ribs 28, 29 and the free edge of the lip 25 is formed with a labyrinthine rib 30 to insure a seal and accommodate for variations in dimensional tolerances.

As further shown in FIGS. 5 and 8, the annular gasket 18 is formed with an annular inwardly facing shoulder 31 that includes a side wall 32 and bottom wall 33, the latter having V-shaped labyrinthine ribs 34 thereon. Side wall 32 is engaged by a portion of the periphery of lens 15 (FIG. 8). The lens has a shoulder 35 formed on the underside at the periphery including a bottom surface 36 and side surface 37 which are complementary to and engage surfaces 32, 33, 38 on the gasket 18. Gasket 18 also has a radially inwardly extending flange 39 having labyrinthine ribs 40 thereon which are engaged by the undersurface 41 on the lens. Screws 42 extend through openings in lens 15 into wall 12 to lock the lens on the lamp.

Further, in accordance with the invention, at least the surfaces 32, 33, 38, 39 are formed with a reflective coating that functions to increase the rearward illumination. Preferably, the entire gasket is made of a light reflective material such as polyvinyl chloride with a white pigment making the entire gasket white.

A preferred composition for the gasket has been found to be polyvinyl chloride having a Shore hardness of $63\pm2$ on the A scale.

Figure 6:
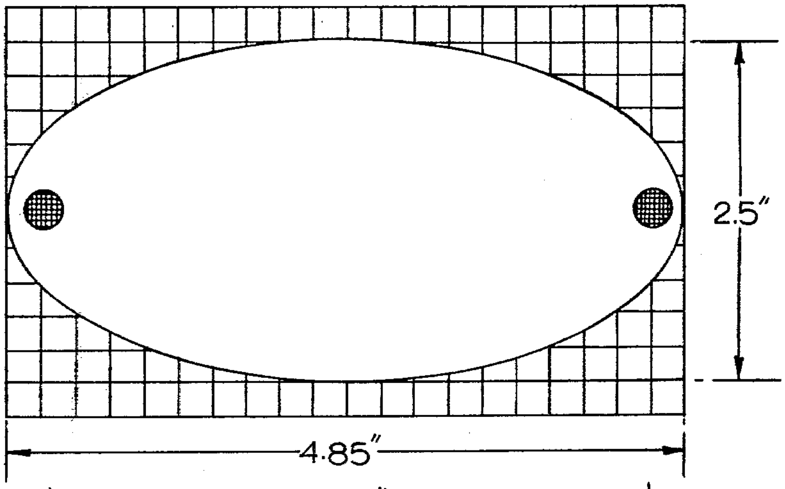
FIG. 6 is an illumination diagram showing the photometrically projected rearward illumination of a vehicle lamp embodying the invention.
Figure 7:
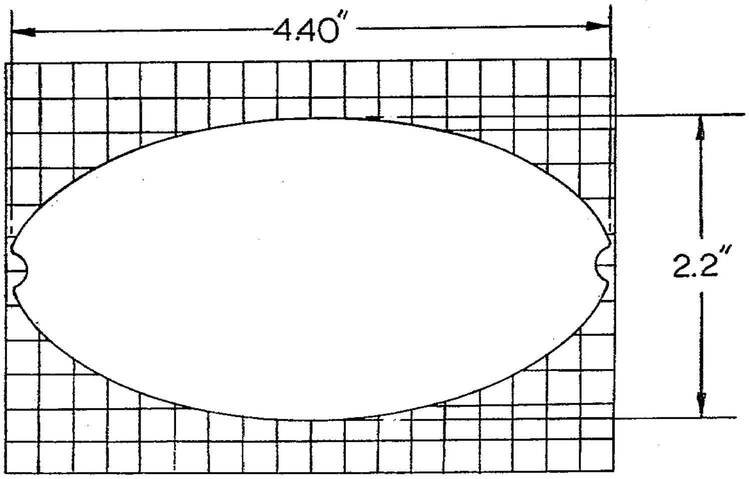
FIG. 7 is an illumination diagram showing the photometrically projected rearward illumination of a prior art vehicle lamp.

The manner in which the reflective surfaces function to increase illumination is shown diagrammatically in FIGS. 6 and 7 which are representative of test results indicating that through a cooperation of the reflective surfaces and the light emanating from the bulb, a greater overall illumination is obtained with the lamp embodying the invention as shown in FIG. 6 than a lamp of the prior art as shown in FIG. 7. The illuminated area of a lamp embodying the invention appears to the eye, and is, greater than the cross sectional area of the illuminated portion of prior art lenses of equal size.

We claim:

1. A vehicle lamp comprising
- a housing having a base wall and a peripheral wall surrounding the base wall,
- said peripheral wall having a free edge,
- a first lens adapted to overlie the free edge of the peripheral wall,
- the peripheral wall having an opening therein extending toward the lens,
- a second lens in the opening having a free edge aligned with the free edge of the peripheral wall,
- an annular gasket,
- said gasket including a radially inwardly extending lip and a groove that telescopes over the free edge of the peripheral wall and second lens,
- said groove including an outer side wall that engages the outer surface of the peripheral wall and the second lens, a base wall that engages the top surface of the peripheral wall and the second lens, and an inner wall that engages the inner surface of the peripheral wall and the second lens,
- said gasket including a radially inwardly extending shoulder extending from the lower end of said outer side wall,
- said peripheral wall and said second lens having a bead on the outer surface thereof beneath which said lip extends,
- said gasket including an annular inwardly facing shoulder having a side wall with a surface engaging a portion of the periphery of said first lens,
- said annularly inwardly facing shoulder of said gasket having a bottom wall having a surface engaging a complementary bottom surface of said first lens,
- said gasket further including a radially inwardly extending flange defining a side surface and a bottom surface,
- said first lens having complementary surfaces engaging said last-mentioned side and bottom surfaces.

2. A vehicle lamp as set forth in claim 1 wherein at least some of the surfaces of said gasket which are engaged by said first lens have labyrinthine ribs thereon.

3. A vehicle lamp as set forth in claim 1 wherein said bottom wall of said shoulder of said gasket and said inner side wall and base wall of said groove of said gasket are formed with labyrinthine ribs.

4. A vehicle lamp as set forth in claim 1 wherein at least some of said surfaces of said gasket are reflective.

5. A vehicle lamp as set forth in claim 1 wherein said side wall and bottom wall of said shoulder of said gasket and said side and bottom surfaces of said radially inwardly extending flange of said gasket are reflective.

6. A vehicle lamp as set forth in claim 1 wherein said gasket is white.

7. A vehicle lamp comprising
- a housing having a base wall and a peripheral wall surrounding the base wall,
- said peripheral wall having a free edge,
- a lens adapted to overlie the free edge of the peripheral wall,
- an annular gasket,
- said gasket including a radially inwardly extending lip and a groove that telescopes over the free edge of the peripheral wall,
- said groove including an outer side wall that engages the outer surface of the peripheral wall, a base wall that engages the top surface of the peripheral wall, and an inner wall that engages the inner surface of the peripheral wall,
- said gasket including a radially inwardly extending shoulder extending from the lower end of said outer side wall,
- said peripheral wall having a bead on the outer surface thereof beneath which said lip extends,
- said gasket including an annular inwardly facing shoulder having a side wall with a surface engaging a portion of the periphery of said lens,
- said annualarly inwardly facing shoulder of said gasket having a bottom wall having a surface engaging a complementary bottom surface of said lens,
- said gasket further including a radially inwardly extending flange defining a side surface and a bottom surface,
- said lens having complementary surfaces engaging said last-mentioned side and bottom surfaces.

8. A vehicle lamp as set forth in claim 7 wherein at least some of the surfaces of said gasket which are engaged by said lens have labyrinthine ribs thereon.

9. A vehicle lamp as set forth in claim 7 wherein said bottom wall of said shoulder of said gasket and said inner side wall and base wall of said groove of said gasket are formed with labyrinthine ribs.

10. A vehicle lamp as set forth in claim 7 wherein at least some of said surfaces of said gasket are reflective.

11. A vehicle lamp as set forth in claim 7 wherein said side wall and bottom wall of said shoulder of said gasket and said side and bottom surfaces of said radially inwardly extending flange of said gasket are reflective.

12. A vehicle lamp as set forth in claim 7 wherein said gasket is white.

* * * * *